Nov. 14, 1967  J. J. EDDY  3,352,108
ATMOSPHERIC PRESSURE PLANT
Filed Nov. 4, 1966
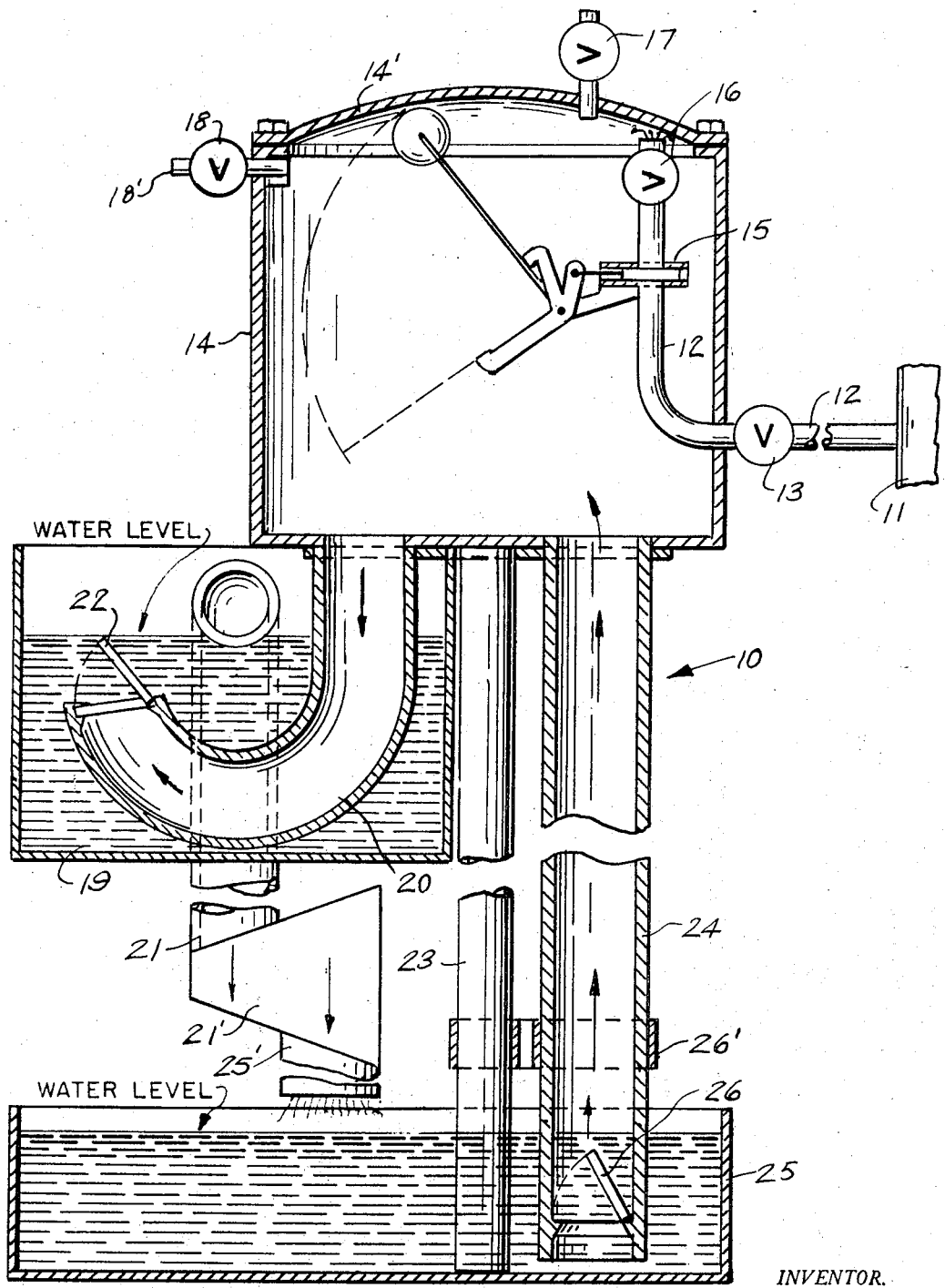
INVENTOR.
*Joseph James Eddy*

United States Patent Office 3,352,108
Patented Nov. 14, 1967

3,352,108
ATMOSPHERIC PRESSURE PLANT
Joseph James Eddy, 8511 Sharp Ave.,
Sun Valley, Calif. 91352
Filed Nov. 4, 1966, Ser. No. 592,046
5 Claims. (Cl. 60—108)

ABSTRACT OF THE DISCLOSURE

An atmospheric pressure plant is disclosed herein including a tank for receiving a charge of live steam adapted to forceably urge a quantity of water to be discharged from the tank at which time a vacuum condition results causing another quantity of water to be forceably drawn from a reservoir into the tank. The discharge water may be employed to operate a turbine.

---

This invention relates to power generating equipment, and more particularly an atmospheric pressure plant.

It is therefore the main purpose of this invention to provide an atmospheric pressure plant which is entirely operated by the atmospheric pressure without the benefit of power lines or related means.

Another object of this invention is to provide an atmospheric pressure plant wherein it is designed in such a manner that conventional pump units having pistons and cylinders are not used thereby reducing a substantial amount of maintenance work.

Another object of this invention is to provide an atmospheric pressure plant which may be constructed to serve farms, water wells, and other remotely located establishments.

Still another object of this invention is to provide an atmospheric pressure plant which is inexpensive to produce, may be shipped long distance in kit-form and then assembled, simple to install, inexpensive to operate, explosion proof, possesses far greater safety factor than the conventional plants, needs no new source of water for operational purposes since water is continuously reused, is of rugged construction, and provides maximum utility to its users.

Other objects and advantages of the invention will become apparent from a consideration of the following detailed description taken in connection with the accompanying drawing, wherein a satisfactory embodiment of the invention is shown. However, it is to be understood that the invention is not limited to the details disclosed but includes all such variations and modifications as fall within the spirit of the invention and the scope of the appended claims.

In the drawing:

The drawing is the sole view of this invention.

According to this invention, an atmospheric pressure plant 10 generally is positioned near a low pressure boiler 11 and is connected thereto by a steam line or pipe 12. A manually operable valve secured on pipe 12 is adapted to regulate the flow of steam from boiler 11 into the vacuum tank 14. In order to make tank 14 operable or operational priming valves 17 secured on the removable cover 14' is arranged to prime said tank when valve 22 of the outward pipe 20 is in a closed position. Simultaneously, drainage control valve 18 secured on the drainage pipe 18' is to remain open. Once vacuum condition is created within tank 14, water is sucked through intake pipe 24 extending downwardly from the bottom portion of tank 14. Water supply is provided from water reservoir 25 in accordance with the operation of a directional valve 26 attached to the bottom portion of 24. When water reaches the horizontal plane of drainage control valve 18, said valve is automatically shut off and the pumping cycle is put into an operation.

It will also be noted that steam control valve 13 is now opened allowing steam to pass through het automatic float valve 15 which usually is in a normally open position. A supplemental control valve 16 at the end portion of pipe 12 regulates the volume of steam entering into the water filled tank 14. This forces the water to flow into the outward pipe 20 and pass through valve 22 before entering run-off tube 21. A turbine unit 21' utilizes this water pressure and rotates in accordance therewith. And an end pipe 25' disposes water from turbine unit 21' into the water reservoir 25. The above explained cycle may be repeated as many times as necessary. Also, to insure structural rigidity of plant 10, a vertically disposed support member 23 directly connects tank 14 with reservoir 25. Furthermore, vertical member 23 and the intake pipe 24 are rigidly secured to each other by a horizontally disposed bracket 26. Assuming a body of water within tank 14 having a level substantially equal to the drainage control valve 18, steam introduced into the tank 14 via pipe 12 will be introduced into the internal cavity between the top level of the body of water and the undersurface of the cover 14'. The cavity may constitute a steam chest where the live steam collects and expands to drive the body of water downwardly. This action may be similar to an external combustion engine, of which the steam engine is a common example wherein the pressure exerted by live steam forceably urges a movable element to reciprocate. Inasmuch as the body of water is forced through the valve 22 into chamber 19, the level of the water lowers so that the float associated with valve 15 effects the closure of the pipe 12 to terminate further introduction of steam into the tank 14. As the remaining steam in tank 14 cools, precipitation takes place resulting in the creation of a vacuum in the now greatly enlarged steam chest chamber which causes the removal of water from the water reservoir 25 via tube 24 into the tank 14. As the level of the water drawn into tank 14 rises, the float associated with valve 15 will move upwardly to open the valve, thereby permitting a new charge of live steam to be introduced into the steam chest cavity of tank 14.

What I now claim is:

1. An atmospheric pressure plant comprising, in combination, a low pressure boiler, a head steam vacuum tank, and L-shaped pipe connecting said boiler to said tank, an automatic floating valve, a steam output regulating valve, a steam control, all said valves being secured on said pipe and adapted to operably cooperate controlled induction of pressure from said boiler into said tank when said tank is flooded with water, a collector tank secured to the bottom portion of said vacuum tank, a J-shaped pipe extending from said vacuum tank into said collector tank for urging steam from said vacuum tank into said collector tank, the end portion of said J-shaped pipe being provided with a regulating valve which is normally closed when said vacuum tank is being primed and normally opened when said steam passes from it, an output pipe downwardly extending from said collector tank, a turbine unit attached to the bottom portion of said output pipe for admitting water therein and generating propulsion means, a water tank beneath said turbine unit, and a water supply means extending upwardly from said reservoir and terminating within said vacuum tank for providing said tank with heat-generated water supply to be recycled into said collector tank and said turbine unit.

2. The combination according to claim 1, wherin said top portion of said vacuum tank is provided with a removable cover member, and a priming valve member is attached to said cover member for priming the vacuum tank prior to operation.

3. The combination according to claim 1, wherein the upper portion of said vacuum tank is provided with a drainage pipe, and a drainage control valve is secured on said drainage pipe for draining surface water from the top portion of said tank when the priming valve is closed.

4. The combination according to claim 1, wherein the bottom portion of said turbine units is being provided with an end pipe for guiding water escaping said unit into said water reservoir so that said water may be recycled.

5. The combination according to claim 1, wherein said water supply means include a vertical intake pipe and a directional valve member secured within the bottom portion of said intake pipe for controlling water inflow from said reservoir into said vacuum tank.

References Cited
UNITED STATES PATENTS

| | | | |
|---|---|---|---|
| 2,035,726 | 3/1936 | Sheldon | 60—108 |
| 2,151,949 | 3/1939 | Turner | 60—108 X |
| 2,258,167 | 10/1941 | Turner | 60—63 |
| 3,006,147 | 10/1961 | Geary | 60—108 X |

MARTIN P. SCHWARDON, *Primary Examiner.*

ROBERT R. BUNEVICH, *Examiner.*